April 7, 1942.  R. T. BRIZZOLARA  2,278,766
AIR CONDITIONING APPARATUS
Original Filed April 13, 1933
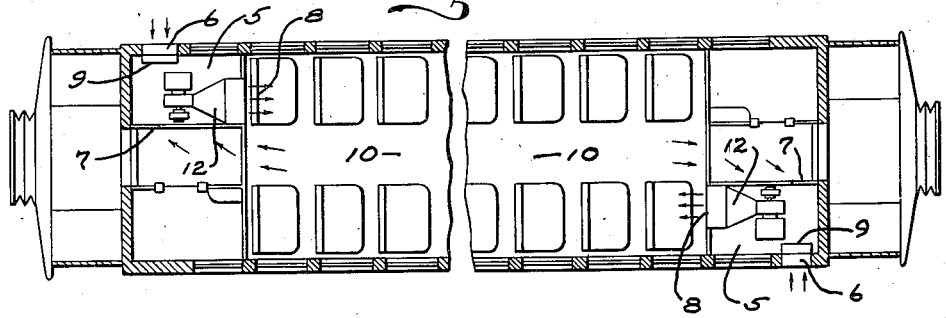
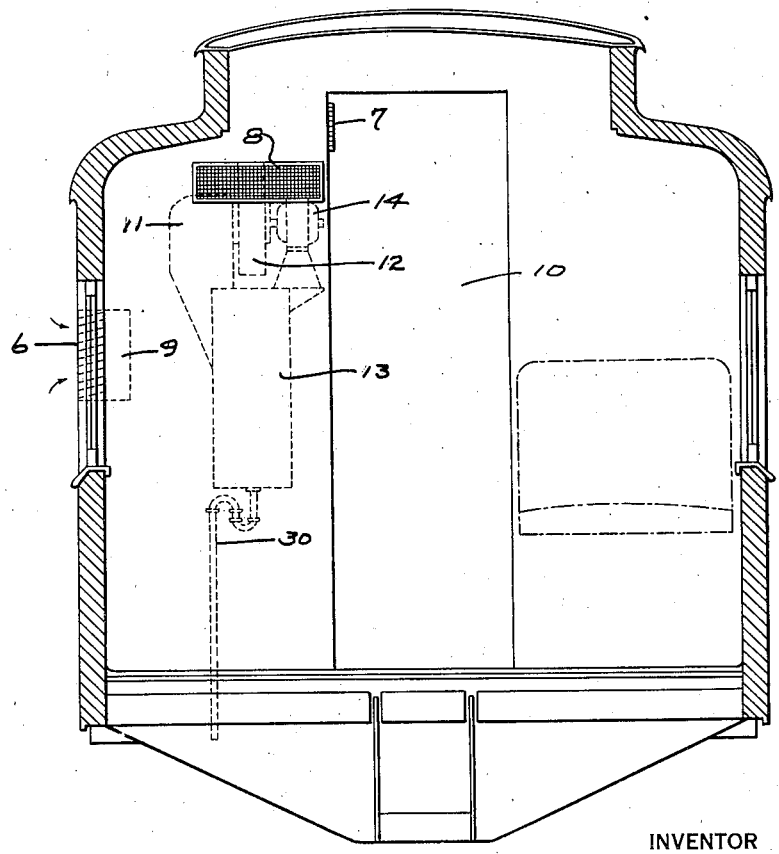
INVENTOR
Robert T. Brizzolara
BY Robert J. Palmer
ATTORNEY Patented Apr. 7, 1942

2,278,766

UNITED STATES PATENT OFFICE 2,278,766

AIR CONDITIONING APPARATUS

Robert T. Brizzolara, New Dorp, N. Y., assignor to B. F. Sturtevant Company, Boston, Mass.

Original application April 13, 1933, Serial No. 665,860. Divided and this application December 30, 1939, Serial No. 311,800

2 Claims. (Cl. 98—10)

This invention relates to the conditioning of air for human comfort and relates more particularly to the refrigeration and dehumidification of air circulated through passenger vehicles.

This application is a division of my application, Serial No. 665,860, filed April 13, 1933 and which issued as Patent No. 2,192,221 on March 5, 1940.

It is now becoming well known that human comfort requires that the air within an enclosure should be not only circulated to provide sufficient ventilation, but should in winter, be warmed, with moisture added to maintain the proper relative humidity, and in summer should be cooled, and moisture extracted from it, to overcome the excessive humidity which is usually present.

While the conditioning of air for motion picture theaters, hotel, office and industrial buildings has been developed to a high degree in recent years, the air conditioning for vehicles, and particularly railway cars, has been more or less neglected, due, perhaps, to the peculiar problems involved and the many difficulties present. Among the difficulties which present themselves are the lack of space in a railway car which already of necessity has had to accommodate the maximum of equipment in the minimum of space, the excessive refrigeration equipment which would have to be carried if the ordinary method of conditioning buildings were followed, the changing temperature conditions through which a railway car must pass, the cost of the equipment, and other difficulties. The weight of refrigerating systems is a serious factor, particularly when this weight must be carried all the year round.

An object of this invention is to condition the air supplied to passenger vehicles with a minimum of apparatus and expense.

Another object of the invention is to condition the air supplied to passenger vehicles without the necessity of modification of the interior of the vehicles.

Another object of the invention is to condition the air supplied to passenger vehicles without using ventilating ducts.

Another object of the invention is to provide a ductless air distribution system for the supply of conditioned air to enclosures.

Another object of the invention is to provide, in an air conditioning system, a novel form of heat exchange surface.

According to a feature of this invention, the conditioned air supplied to the passenger space of a vehicle, or the space occupied by persons in any other form of enclosure, is first conditioned and then forced at high velocity from a conditioning unit having a discharge located at one end of the enclosure, above the space to be served and down along one side of the enclosure. Located at the other end of the enclosure is another conditioning unit into which the conditioned air supplied by the other unit is drawn and again conditioned, and again discharged at high velocity over the space to be served, down along the other side of the enclosure, where it is picked up and indrawn, by the action of a blower in the first conditioning unit, into the first conditioning unit, and again conditioned. Thus, a continuous circuit or loop of conditioned air is kept in movement, above the space being served, the conditioned air being directed down one side of the enclosure and up the other side by the cooperating action of the two units, the one picking up the air discharged by the other unit, conditioning it, and again discharging it. Blowing the high velocity air to the other fan's suction, tends to control the direction of flow in a manner to prevent drafty currents of cold air eddying downward on passengers. Outside air is filtered and supplied in sufficient quantities to one or the other, or both, of the units to add make-up air, and to maintain a positive static pressure slightly above outside pressure. This feature eliminates the infiltration of dust and cinders into the car through crevices and cracks, since the flow of air through these points will be from the inside of the car, where the higher pressure prevails to the outside.

In summer operation, for which this invention is primarily intended, the air supplied is cooled and dehumidified. The cold air discharged at high velocity from the conditioning units is heavier than the warm air within the enclosure and advantage is taken of this fact to provide what is believed to be a new circulating system. According to this invention, rapid circulation of the cold air is maintained over the heads of the occupants of the enclosure. The colder air, due to the static pressure and the relative air densities existing within the space being served and in the circulating air stream, trickles down from the main overhead stream.

The invention will now be described with reference to the drawing, of which:

Fig. 1 is a plan, in section of a railway passenger car equipped with an air conditioning system embodying this invention, and Fig. 2 is a transverse sectional view of the car of Fig. 1.

In the opposite diagonal corners of the car, the two similar rooms 5 are formed by partitions. These rooms are airtight except for the fresh air inlet openings 6, the recirculated air inlet openings 7 and the discharge outlets 8.

The fresh air inlets 6 extend through the sides of the car to the atmosphere and preferably contain filters 9. The recirculated air inlets 7 border on and extend parallel to the central aisle 10 of the car and at right angles to the bulkhead air discharge outlets 8. The recirculated air inlets 7 are also above the outlets 8, for more effectively receiving the recirculated air which tends to rise in convection currents, to the roof of the car.

The rooms 5 contain similar air conditioning units 11 comprising blowers 12 driven by electric motors 14, and air cooling compartments 13. The compartments 13 contain extended surface type heat exchangers of the type disclosed in my said patent. The heat exchangers in the compartments 13 may be supplied with a volatile refrigerant for cooling the air through direct expansion, or may be supplied with ice water from melting ice, as disclosed in my said copending application. The pipe 30 serves to discharge to the tracks the moisture condensed from the air on the heat exchangers in the compartments 13.

In operation, the blowers draw in fresh air through the inlets 6, and recirculated air through the inlets 7, the two air streams mixing in the rooms 5 and passing through the cooling compartments 13 where the mixed air is cooled and dehumidified.

The cold air is discharged by one outlet 8 down along one side of the car and overhead the passenger space, and through the inlet 7 in the opposite diagonal corner of the car, into the opposite cooling compartment where it is recooled and discharged from the other outlet 8 down along the other side of the car and overhead the passenger space. The cold air thus travels in a closed loop circuit above the passenger space and cold air from the loop circuit trickles down by gravity into the passenger space to cool same.

It is seen that this invention provides a ductless system for the distribution of conditioned air. As is well known, for the summer conditioning of air, it is not sufficient to merely cool the air to the desired dry bulb temperature, this because normally too much moisture for human comfort remains in the air at that temperature. It is necessary to cool the air below the desired dry bulb temperature in order that the dew point of the air may be reduced sufficiently that sufficient moisture content for comfort purposes is precipitated on the extended surfaces. As a result of this necessity for dehumidification, the air discharged normally has too low a dry bulb temperature or sensible heat for comfort. If this air was discharged directly into the space adjacent a person, he would feel a pronounced chill and draft and would be uncomfortable, it having been demonstrated that a temperature difference of more than about 5% produces undesirable draft and chill conditions.

In theaters and other enclosures where air is conditioned in summer, it is customary to heat the air after it is cooled to raise its sensible heat to that desired. This has been accomplished in the past either by the use of steam coil tempering devices, or by the recirculation of air from the auditorium where it is mixed within the conditioning unit with the cold air to raise the sensible heat thereof prior to discharge. Such arrangements require, of course, expensive tempering devices or expensive duct work, requiring space which is not available in railway cars, for example.

According to this invention, the high velocity stream of very cold air discharged above the space occupied by the passengers, does not enter directly the space immediately adjacent the passengers and thus produce drafts and discomfort. On the contrary, the cold air trickles down gradually under the static pressure and the influence of gravity to penetrate the lower levels, displacing at the same time warmer air. As the very cold air seeps down gradually, it has its sensible heat raised by contact with the warmer air within the passenger space to that desired, so that the conditioned air finally reaching the passengers has the desired temperature and sensible heat. Thus, the by-pass principle is made use of without the necessity of returning the recirculated air to the conditioning unit prior to the discharge of the conditioned air.

Another important feature of the invention is, of course, that the use of distributing ducts is dispensed with. In the air conditioning systems in railway cars common at the present time, longitudinal distribution ducts are placed down one or both sides of the car. Such ducts are not necessary according to this invention. Furthermore, no useful space is occupied by the apparatus according to this invention. Thus, none of the valuable space required for seating the passengers is utilized for air conditioning purposes.

In certain types of installations, for example club cars and diners where the car is considerably shortened, it may not be necessary to use oppositely placed air conditioning units operated as described, but one unit may be eliminated entirely, or both units may be used and one unit operated as a dummy. That is, its blower alone is operated, no refrigerant being supplied to its coils, the blower assisting in the circulation of the conditioned air supplied by the other unit.

What is claimed is:

1. A ductless air conditioning system for a passenger vehicle having a central aisle, comprising air conditioning units extending vertically from the floor to above the passage space of and located in opposite diagonal corners of the vehicle on opposite sides of and at the ends of said aisle, said units having diagonally opposite, overhead, bulkhead air discharge outlets in planes extending transverse the vehicle, and having oppositely disposed, recirculated air inlets bordering on and extending in planes parallel to said aisle and perpendicular to said outlets, said inlets being located above said outlets.

2. A ductless air conditioning system for a passenger vehicle having a central aisle, comprising air conditioning units extending vertically from the floor to above the passage space of and located in opposite diagonal corners of the vehicle on opposite sides of and at the ends of said aisle, said units having diagonally opposite, overhead, bulkhead air discharge outlets in planes extending transverse the vehicle, having oppositely disposed, recirculated air inlets bordering on and extending in planes parallel to said aisle and perpendicular to said outlets, said inlets being located above said outlets, and having fresh air inlets extending through the sides of said vehicle.

ROBERT T. BRIZZOLARA.